Nov. 3, 1964     H. G. MUSOLF     3,155,401
WELL HEAD ASSEMBLY
Filed Feb. 6, 1961     2 Sheets-Sheet 1

INVENTOR.
HERBERT G. MUSOLF
BY *Frederick Mattingly & Huntley*
Attorneys

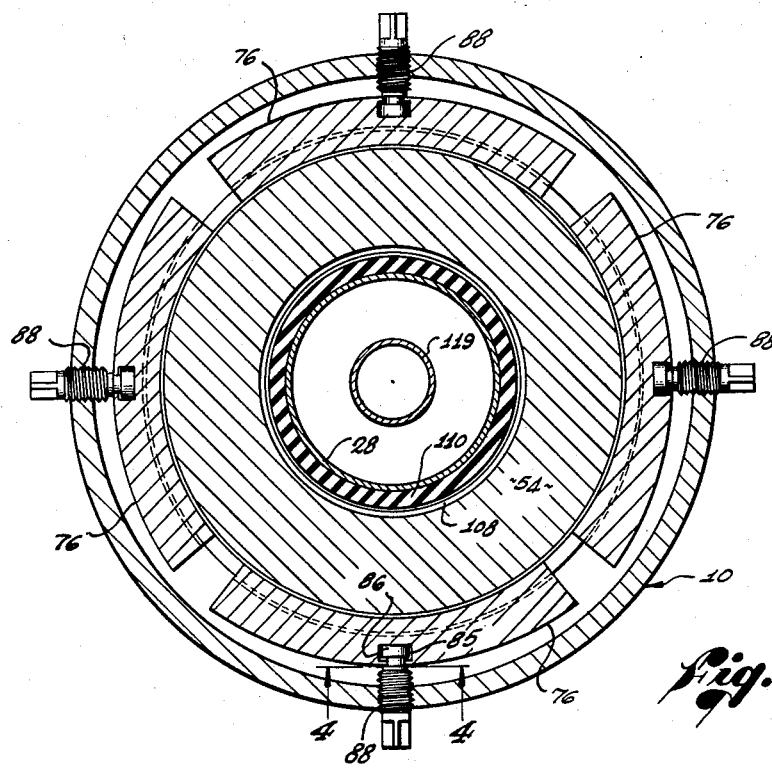
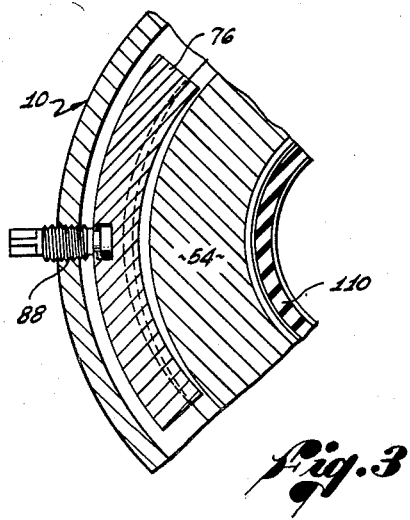
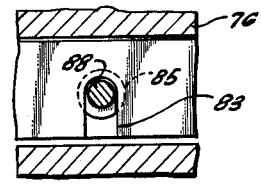

3,155,401
WELL HEAD ASSEMBLY
Herbert G. Musolf, 10512 Rose Ave., Stanton, Calif.
Filed Feb. 6, 1961, Ser. No. 87,129
5 Claims. (Cl. 285—18)

This invention relates to well head assemblies and more particularly to combination casing head and tubing head production assemblies for wells.

Casing head and tubing head combination assemblies as heretofore more or less conventionally constructed necessitated the employment of either flanged interconnections between casing head and tubing head housings together with the associated bolts, ring gaskets and the like sealing and supporting means; or the employment of ring clamps and the like coupling devices also requiring ring gaskets, special ring flanges and the like sealing and assembling means. Such conventional constructions have numerous well known practical disadvantages and deficiencies.

For example, in the flange coupled assemblies, the installation and proper and uniform tensioning of the numerous bolts, cap screws or studs, as the case may be, by which the flanged connections are joined, is a critically sensitive operation requiring careful and time-consuming effort. Also, inherent in such coupling means, however carefully such operations are performed, is a certain amount of resultant distortion of the flanges particularly where ring type metal gaskets are employed for sealing between the flanges, because such gaskets act in effect as circular fulcrums over which the flanges tend to bend under the stresses imposed upon them by the offset interconnecting bolts. Such bending has several undesirable effects, such as the impairing of the precise alignment and fit required between ring gasket and the ring grooves and additionally causing scuffing or marring of the microfinishes usually initially provided on such sealing parts. The expense of providing such finishes and precise fits of ring gaskets and grooves is also a distinctly objectionable and expensive feature and when such assemblies fail to be fluid-tight or develop leaks it is necessary to substantially dismantle the assembly and replace the defective parts. Most of the before-mentioned disadvantages and difficulties are also present in the ring clamp types of couplings, because for the most part they require the same or similar kinds of ring gaskets together with the associated critical problems of fit tolerances and quality of finishes.

Other disadvantages of such conventional assemblies heretofore employed are that the coupling and uncoupling of the several units and components of the well head assembly require a large number of manual operations, and most of such operations must be performed at the exact site of such equipment; in other words, such complicated assembly or disassembly operations cannot be performed from a location remote from the well head. Other disadvantages of such equipment as heretofore employed resides in the fact that apparently the best designs left much to be desired insofar as strength and reliability thereof is concerned.

Accordingly, it is an object of this invention to provide an improved type of well head assembly which is simpler, has fewer parts, is less expensive to manufacture, is less time-consuming and safer in its assembly and disassembly in connection with well completion operations, than has been the case with well head assemblies heretofore known and used.

Another object of this invention is to provide a combination tubing head and casing head assembly construction in which the usual cumbersome and time-consuming bolted flange and clamp types of interconnections between tubing head, casing head and other components thereof are eliminated.

Another object of this invention is to provide means for facilitating connection and disconnection between the casing head housing, tubing head housing, and between the tubing head housing and tubing suspension mandrel which may be operated either at the well head location or remotely and either manually or by pneumatic, hydraulic, electric or other power means or a combination of any such means.

Another object of this invention is to provide a well head assembly construction in which are reduced the expulsion forces of the fluid pressures in the well upon both the tubing mandrel and tubing head housing.

It is a still further object of this invention to provide a well head structure in which the casing head, tubing head and tubing suspension means incorporate improved sealing means therebetween and which is of less expensive construction, more reliable and which minimizes the occurrence of improper assembly and resultant looseness and leakage.

It is a still further object of this invention to provide a well head assembly in which leaks around the seals and joints of the several components can be eliminated or repaired while maintaining full well pressures.

It is a still further object of this invention to provide a well head assembly structure in which the various components thereof are coupled together by means which impart optimum strength and resistance to separation thereof by the forces resulting from the fluid pressures within the well.

These and other objects, advantages, and features of novelty will be evident hereinafter.

In the drawings which illustrate a preferred embodiment of the invention and in which like reference character designate the same or similar parts throughout the several views:

FIGURE 2 is a cross sectional view taken on line 2—2 of FIGURE 1;

FIGURE 3 is a fragmentary cross sectional view of a portion of FIGURE 2 illustrating the condition of a portion of the apparatus at an intermediate stage of its assembly; and FIGURE 4 is a fragmentary view partly in elevation and partly in longitudinal section taken on line 4—4 of FIGURE 2.

Figure 1:
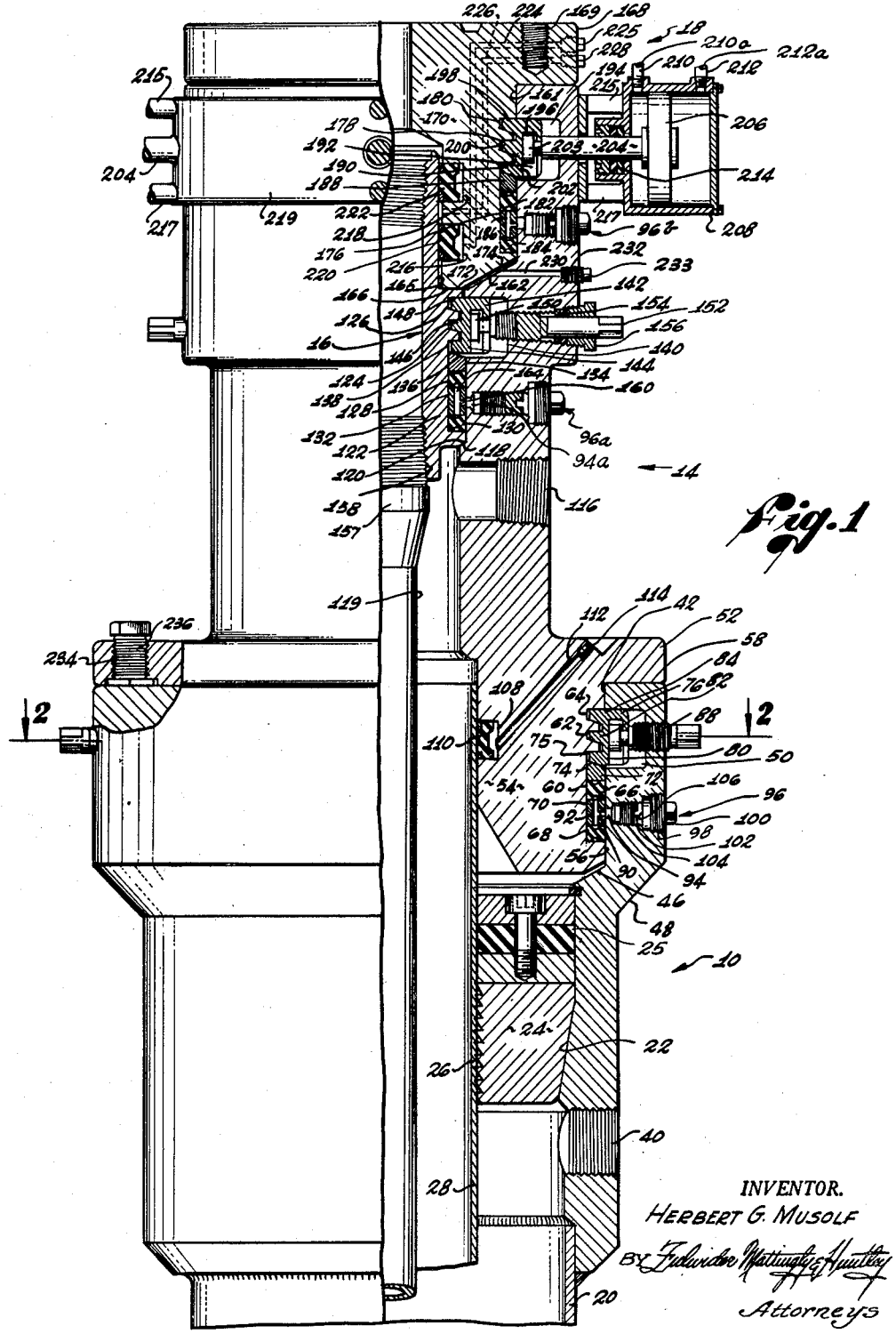
FIGURE 1 is a view, half in elevation and half in longitudinal section, of the casing head and tubing head assembly of the invention.

The apparatus is as follows:

Referring primarily to FIGURE 1, the general assembly of the apparatus comprises five principal components which are, in approximate order from lower to upper end thereof, a casing head housing 10 connected to the upper end of a conventional surface pipe string 20; a conventional casing hanger slip and packing assembly 25 contained within the casing head housing; a tubing head housing 14 telescopically coupled within and seated upon the upper end portion of the casing head housing; a tubing suspension mandrel 16 suspended within an upper portion of the tubing head housing; and a Christmas tree adapter 18 telescopically coupled within and seated upon the upper end of the tubing head housing.

An intermediate section of the bore of the casing head housing 10, is formed with a downwardly converging frusto-conical, slip-supporting surface 22 upon which are slidably supported a plurality of tapered segmental slips 24 comprising a part of the conventional casing hanger slip and packing assembly 25, such slips being provided on the inner surfaces thereof with wickers 26 for making gripping engagement with the outside surface of an inner string of casing 28 to be suspended thereby in the well. A threaded port 40 is provided through the lower portion of the casing head housing wall, which communicates in usual manner with the annulus between the inner casing string 28 and the surface string 20. Piping connections may be made with the port 40 for production or introduction of fluids as desired.

The upper end portion of the casing head housing, instead of being provided with a terminating radial flange of the conventional type for making bolted connection to a companion flange of apparatus to be connected thereto, is formed with an enlarged upper end section terminating in an annular end surface 58. The inside diameter of the bore 42 and the outside diameter thereof are increased with respect to those of the lower portion of the casing head housing, the juncture of such upper and lower sections thereof forming an intermediate, flared interval having internal and external frusto-conical shoulders 46 and 48, respectively. The bore 42 of the upper end portion of the casing head housing is of uniform inside diameter upwardly from the aforesaid internal shoulder 46 except for an inwardly facing, annular groove or recess 50.

The lower portion of the tubing head housing 14 is formed with an intermediate, outwardly extending, blank flange member 52 beneath which extends a coaxial, annular coupling section 54 having a generally cylindrical outside surface 56 making a longitudinally telescoping fit within the aforesaid bore 42 of the casing head housing, and with the blank flange 52 normally seating upon the upper end surface 58 of the casing head housing wall. The before-mentioned exterior cylindrical surface 56 of the aforesaid coupling section 54 is formed with three longitudinally spaced-apart, concentric, outwardly facing annular grooves 60, 62 and 64. The lowermost groove 60, of the aforesaid grooves, contains an annular seal assembly consisting of upper and lower resilient, annular seal rings 66 and 68 spaced apart by a ducted, metal spacer ring 70 and topped by an annular, metal retainer ring 72. The upwardly facing surface of the retainer ring 72 is formed with a downwardly diverging frusto-conical surface 74. The annular grooves 62 and 64 are likewise formed with upwardly facing end surfaces of downwardly diverging frusto-conical form. Thus, with the annular sealing assembly including the retainer ring 72 in place in the groove 60, three annular grooves of identical shape are in effect formed, namely, the before-mentioned annular grooves 62 and 64 and in effect an additional groove 75 bounded on its lower edge by the before-mentioned upper, frusto-conical surface 74 of the retainer ring 72.

Retained within the before-mentioned annular recess 50, within the bore 42 of the upper portion of the casing head housing, are a plurality of radially extendable and retractable, circumferentially spaced-apart, arcuate locking shoes 76. The inwardly facing cylindrical surfaces of the locking shoes 76 are each formed with three annular, concentric, longitudinally spaced-apart lands 80, 82 and 84, each having lower, downwardly diverging frusto-conical surfaces matching the before-mentioned upper frusto-conical surface of the grooves, such that when the locking shoes 76 are in their inwardly extended positions as shown in FIGURES 1 and 2, the lands 80, 82 and 84 make tight interlocking engagement with the grooves 75, 62 and 64, respectively. The number of such grooves and lands need not be confined or limited to three, as herein shown and disclosed by way of example, but may be any number as desired or as required by design and strength considerations. Normally, with the locking shoes 76 in outwardly retracted position within the annular recess 50, the retainer ring 72 rides in the groove 60 slightly above the position shown in FIGURE 1, such that upon insertion of the land 80 into the groove space 75 above the retainer ring 72, the lower sloping surface of the land 80 makes sliding, wedging engagement with the matching upper sloping surface 74 of the retainer ring 72, thereby forcing the retainer ring 72 downwardly within the groove 60 sufficiently to apply some initial energization to the resilient seal rings 66 and 68, thereby providing an initial fluid seal between the adjacent coupling surfaces of the casing head and tubing head housings.

Each of the locking shoes 76 is provided in its outer side, intermediate its ends, with a connector slot 83 having an undercut slotted portion 85 of increased width with respect to slot 83 and adapted to receive therein the head 86 of the inner end of one of the threaded locking shoe operating screws 88 which extend radially through the casing head housing wall. By rotational adjustment of the operating screws 88, the locking shoes 76 may be either extended from the recess 50 to thrust the lands 80, 82 and 84 thereof forcefully into locking engagement with the corresponding grooves in the tubing head housing or they may be retracted to a position wholly within the recess 50 at which the lands are out of engagement with the clear of such grooves.

The spacer ring, 70 of the before-described seal assembly located in the groove 60 between the outer lower portion of the tubing head housing and the upper inner bore of the casing head housing, is provided with an intermediate, outwardly facing peripheral groove 90, which communicates along its inner surface with a plurality of circumferentially spaced-apart ducts 92 which extend vertically between the upper and lower end surfaces of the spacer ring 70 into communication with the dished lower surface of the upper seal ring 66 and the dished upper surface of the lower seal ring 68. In assembled position, the annular groove 90 of the spacer ring 70 registers with the innermost end opening 94 of an injection port 96. The injection port 96 comprises a passage extending radially through the wall of the casing head housing and having an internally threaded outer end portion 98 adapted to receive a threaded closure plug 100, and having an internally threaded intermediate portion 102 of reduced inside diameter as compared to the outer threaded portion 98, containing a threaded driving screw 104, having a wrench socket 106 in the outer end thereof.

The bore of the lower portion of the tubing head housing opposite the before-described seal assembly and locking shoes 76 and which receives the upper end extension of the casing 28, is provided with an inwardly facing annular groove 108 which contains a resilient, annular sealing ring 110 for making a fluid-tight seal between the outside surface of the casing 28 and the bore of the tubing head housing. The clearance space behind the sealing ring 110 in the ring groove 108 makes connection with a duct 112 extending laterally through the wall of the tubing head housing. The outer threaded end 114 of the duct 112 is threaded for connection with suitable means for injecting fluid or plastic material under pressure into the aforesaid clearance space for forcing and retaining the seal ring 110 in tight sealing engagement between the groove 108 and the outside surface of casing 28. Such injection means may, for example, be similar to that hereinbefore described in connection with the injection port 96.

A threaded port 116 is provided through the intermediate portion of the tubing head housing wall communicating with the annulus between the inside of the casing string 28 and the outside of a tubing string 119 suspended from the tubing head housing as will hereinafter be described.

The intermediate portion of the bore of the tubing head housing 14 is formed with an upper section which is of slightly greater inside diameter than the lower section thereof, the juncture of such sections forming an upwardly and inwardly facing, beveled shoulder 118. The tubing suspension mandrel 16 coaxially contained within the upper end portion of the tubing head housing is formed, adjacent its lower end, with an exterior, downwardly facing beveled shoulder 120, which in the assembly, normally seats upon the aforesaid upwardly facing beveled shoulder 118 of the tubing head housing bore. The lower end portion of the tubing suspension mandrel is also formed with a plurality of longitudinally spaced-apart, concentric, outwardly facing, annular grooves 122, 124 and 126, formed around the generally cylindrical exterior of the tubing mandrel. The lowermost groove 122, of the aforesaid grooves, contains an annular seal assembly similar to that hereinbefore described in connection with the coupling between the casing head and tubing head housing, consisting of upper and lower resilient annular seal rings 128 and 130 spaced apart by a ducted spacer ring 132 and topped by an annular metal retainer ring 134. The upwardly facing surface of the metal retainer ring 134 is formed with a downwardly diverging, frusto-conical surface 136. The annular grooves 124 and 126 are likewise formed with upwardly facing, end surfaces of downwardly diverging frusto-conical form. Thus, with the annular sealing assembly including the retainer ring 134 assembled in the groove 122 as shown, three annular grooves of identical shape are in effect formed in the exterior surface of the tubing suspension mandrel, namely the before-mentioned annular grooves 124 and 126 and in effect an additional groove 138 bounded on its lower edge by the before-mentioned upwardly sloping surface 136 of the retainer ring 134.

The bore of the tubing head housing at a location opposite the before-mentioned grooves 124, 126 and 138, is provided with an inwardly facing, annular recess 140, similar to recess 50 hereinbefore described in connection with the coupling between the casing head and tubing head housings. Retained within the annular recess 140 are a plurality of radially extendable and retractable, circumferentially spaced-apart, arcuate locking shoes 142 of a construction and configuration similar to the before-described locking shoes 76, except they are of a lesser inside diameter to accommodate the lesser outside diameter of the grooves in the tubing suspension mandrel. The inwardly facing cylindrical surfaces of the locking shoes 142 are each formed with three annular, longitudinally spaced-apart lands 144, 146 and 148, each of such lands having lower, downwardly diverging, frusto-conical surfaces matching the before-mentioned upper frusto-conical surfaces of the grooves, such that when the locking shoes 142 are in their inwardly extended position, as shown in FIGURE 1, the lands 144, 146 and 148 make tight interlocking engagement with the grooves 138, 124 and 126, respectively. The number of such grooves and lands need not be confined or limited to three of each, as herein described, but may be any number as desired or as required by design and strength considerations. Normally, with the locking shoes 142 in outwardly retracted position within the annular recess 140, the retainer ring 134 extends slightly above the position shown in FIGURE 1, such that upon insertion of the land 144 into the groove space above the retainer ring 134, the lower frusto-conical surface of the land 144 makes sliding, wedging engagement with the upper sloping surface of the retainer ring 134, thereby forcing the retainer ring 134 downwardly within the groove 122 sufficiently to apply some initial energization to the resilient seal rings 128 and 130 therein, thereby providing an initial fluid seal between the adjacent coupling surfaces of the tubing suspension mandrel and the tubing head housing.

Each of the locking shoes 142 is provided in its outer side, intermediate its ends, with a connector slot similar to that hereinbefore described in connection with the locking shoes 76. Such slot is adapted to receive the head 150 of the inner end of one of the threaded locking shoe operating screws 152 which extend radially through the tubing head housing wall. By rotational adjustment of the operating screws 152 the locking shoes 142 may be either extended from the recess 140 to force the lands 144, 146 and 148 thereof, into locking engagement with the grooves 138, 124 and 126, respectively, in the tubing suspension mandrel or they may be retracted to a position entirely within the recess 140 at which the lands are clear of such grooves. An intermediate section of the locking shoe operating screw 152 is provided with a smooth cylindrical exterior surface which passes through a packing joint in the wall of the tubing head housing comprising a set of packing rings 154 and a packing gland nut 156.

The upper end of the tubing string 119 is provided with a conventional upset end 157 having external threads which make threaded connection with internal threads at 158 in the lower end of the tubing suspension mandrel 16.

The spacer ring 132 of the seal assembly positioned between the outer surface of the tubing suspension mandrel and the intermediate inner bore of the tubing head housing is provided intermediate its upper and lower ends with an outwardly facing, peripheral groove 160 which connects with a plurality of circumferentially spaced-apart ducts 164 extending vertically through the ring between the upper and lower end surfaces thereof and into communication with the dished lower surface of the upper seal ring 128 and the dished upper surface of the lower seal ring 130. In assembled position the annular groove 160 of the spacer ring 132 registers with the innermost end opening 94a of an injection port 96a extending radially through the inner wall of the bore of the tubing head housing. The injection portion 96a is identical in form and contents to the hereinbefore described injection port 96.

The upper end of the tubing head housing is formed with an end bore 161 of somewhat greater inside diameter than its intermediate bore, the juncture therebetween forming an outwardly diverging, upwardly, inwardly facing, frusto-conical shoulder 162. The upper end of the before-mentioned tubing suspension mandrel 16 is formed with a cylindrical surface 165 of an outside diameter slightly less than the lower portion of the tubing suspension mandrel, the juncture therebetween forming an upwardly facing, annular shoulder 166.

The before-mentioned Christmas tree adapter 18 is formed at its upper end portion with a top flange 168 and an integral, downwardly extending, coaxial, annular body portion 170. The body portion 170 terminates in a lower end having an annular surface 172 and an upwardly diverging, frusto-conical surface 174. With the Christmas tree adapter 18 installed in the upper end of the tubing head housing as shown in FIGURE 1, the body portion 170 thereof extends telescopically within the annular space formed between the before-mentioned upper end bore 161 of the tubing head housing and the outer upper cylindrical surface 165 of the tubing suspension mandrel, with the before-mentioned annular surface 172 and the upper annular shoulder 166 of the tubing suspension mandrel, and with the flange 168 seated upon the upper end surface 58a of the tubing head housing. In such coupled position the downwardly-facing frusto-conical end surface 174 of the Christmas tree adapter body 170 parallels but is spaced a slight distance apart from the before-mentioned upwardly facing, frusto-conical shoulder 162 in the bore of the tubing head housing.

The outer cylindrical surface of the body 170 of the Christmas tree adapter 18 is formed with a plurality of longitudinally spaced-apart, outwardly facing, annular grooves 176, 178 and 180. The lowermost one, 176 of the aforesaid grooves contains an annular seal assembly similar to the two before-described seal assemblies in the casing head and tubing head housings, and comprises upper and lower resilient annular seal rings 182 and 184, spaced apart by a ducted, metal spacer ring 186 and topped by an annular metal retainer ring 188. The upwardly facing surface of the metal retainer ring 188 is formed with a downwardly diverging, frusto-conical surface 190. The before-mentioned annular grooves 178 and 180 are likewise formed with upwardly facing surfaces of downwardly diverging frusto-conical form. Thus, with the annular sealing assembly including the retainer ring 188 in place in the groove 176, three annular grooves of identical shape are in effect formed, namely, the before-mentioned annular grooves 178 and 180 and in effect an additional groove 192 bounded on its lower edge by the before-mentioned upper frusto-conical upper surface 190 of the retainer ring 188.

The upper end bore 161 of the tubing head housing, at a location opposite the before-mentioned grooves 178, 180 and 192, is formed with an inwardly facing annular recess 194 similar to the before-described annular recesses 50 and 140. Retained within the annular recess 194 are a plurality of radially extendable and retractable, circumferentially spaced-apart, arcuate locking shoes 196 of a construction and configuration also similar to the before-mentioned locking shoes 76 and 142, except that they are of a diameter intermediate the diameters of the locking shoes 76 and 142 to accommodate the intermediately dimensioned diameters of the grooves 178, 180 and 192 in the Christmas tree adapter. The inwardly facing cylindrical surfaces of the arcuate locking shoes 196 are each formed with a plurality, herein shown and described by way of example are three, parallel, annular, concentric, longitudinally spaced-apart lands 198, 200 and 202. The lower edge of each such land has a downwardly diverging, frusto-conical surface matching the frusto-conical upper surface of the grooves, such that when the locking shoes 196 are in inwardly extending position as shown in FIGURE 1, the lands 198, 200 and 202 thereof make tight interlocking engagement with the grooves 192, 178 and 180, respectively. Normally, with the locking shoes 196 in outwardly retracted position within the annular recess 194, the retainer ring 188 extends slightly above the position shown in FIGURE 1, such that upon insertion of the land 202 into the grooved space 192 above the retainer ring 188, the lower frusto-conical surface of the land 202 makes sliding, wedging engagement with the upper matching frusto-conical surface of the retainer ring 188 downwardly within the groove 176 sufficiently to apply some initial energization to the resilient seal rings 182 and 184 therein, thereby providing an initial fluid seal between the adjacent coupling surfaces of the body 170 of the Christmas tree adapter and the upper end bore 161 of the tubing head housing.

The spacer ring 186 of the seal assembly contained in groove 176 between the outer surface of the tubing suspension mandrel and the inner bore of the tubing head housing is of the same form as the before-described spacer rings 70 and 132 and communicates with an injection port 96b which is identical in construction and internal components to the hereinbefore described injection port 96.

Each of the locking shoes 196 is provided in its outer side intermediate its ends, with a connector slot similar to that hereinbefore described in connection with the locking shoes 76 and 142. Each such slot is adapted to receive the head 203 of the inner end of one of the locking shoe operating piston rods 204 which extend radially through the upper portion of the tubing head housing wall. By longitudial inward or outward movement of the piston rods 204, the locking shoes 196 may be respectively extended from the recess 194 into forceful locking engagement with the grooves in the Christmas tree adapter body or may be retracted to a position within the recess 194 clear of such grooves. The outer end of each locking shoe operating piston 204 is connected to a piston 206 which in turn is reciprocably contained within a cylinder 208. Ports 210 and 212 and fluid conduits 210a and 212a are provided for the wall of the cylinder 208 adjacent opposite ends thereof for fluid pressure connections for movement of the pistons 206 in either direction within the cylinder 208. The fluid conduits 210a and 212a may extend to a conventional source of fluid pressure located at a position remote from the wellhead. By way of example, the wellhead may be submerged, as in the case of offshore drilling. The piston rods 204 pass into the ends of the cylinders 208 through suitable packing glands such as shown at 214. Each of the cylinders 208 is attached to the exterior top portion of the tubing head housing by suitable means such as a pair of struts 215 and 217 which extend from the inner end portion of each of the cylinders 208 to a ring 219. While the locking shoes 76 and 142 are herein described as being adapted to be manually adjusted by threaded operating screws 88 and 152 these may, if desired, be power operated by means such as described in connection with the locking shoes 196, or vice-versa.

The bore of the boy 170 of the Christmas tree adapter 18 which receives the upper end of the tubing suspension mandrel 16 is provided with a pair of longitudinally spaced-apart, inwardly facing annular grooves 216 and 218 which contain resilient annular sealing rings 220 and 222, respectively, for making fluid-tight seals between the outside surface of the upper portion of the tubing suspension mandrel 16 and the inside surface of the bore of the body 170 of the Christmas tree adapter. The clearance space behind the sealing rings 220 and 222 and the bottom surface of the ring grooves 216 and 218, makes connection with a duct 224 which extends therefrom to the exterior of the outer edge of the flange 168 and the duct is there provided with threads, shown closed by a threaded plug 225, for making threaded connection with suitable means for injecting fluid or plastic material under pressure into the aforesaid clearance spaces in the ring grooves 216 and 218 for forcing the rings 220 and 222 into sealing engagement between the ring grooves and the outside surface of the tubing suspension mandrel. Such means may, for example, be similar to that hereinbefore described in connection with the injection port 96.

A duct 226, similar to duct 224, extends from the clearance space between the exterior of tubing suspension mandrel and the bore of the body 170 of the Christmas tree adapter at a point intermediate the before-mentioned ring grooves 216 and 218 and their contained seal rings 220 and 222, such duct also extending to the exterior of the edge of the flange 168. The outer threaded end of the duct 226, shown closed with a plug 228, is adapted for connection to testing apparatus as will hereinafter be described. The clearance space between the lower frusto-conical end surface 174 of the body of the Christmas tree adapter and the adjacent, parallel frusto-conical shoulder 162 of the tubing head housing is connected by means of a laterally extending duct 230 to a threaded port 232, shown closed by a threaded plug 233, in the outer surface of the head of the tubing head housing for connection to testing equipment as will be hereinafter described.

The before-mentioned flange 168 of the Christmas tree adapter is provided with threaded drill holes, one of which is shown at 169, for receiving the lower threaded ends of a plurality of stud bolts or cap screws by means of which a companionate flange of a master gate valve or other equipment or connections desired to be installed on top of the assembly.

The flange 52 of the tubing head housing is provided with a plurality of circumferentially spaced-apart threaded holes 234 for threadedly receiving jack screws 236, to be employed, if necessary, for applying force for initial separation of the flange 52 and the body 10 from coupling engagement with the upper end of the tubing head housing when it is desired to disassemble such components.

*Operation and Assembly*

In the assembly of the hereinbefore described apparatus, after the casing head housing 10 has been attached to the upper end of the surface string 20 in accordance with the usual practice, the inner casing string 28 is landed on the slips 24 and the casing cut off to a suitable length such as shown in FIGURE 1. Next, the annular packing assembly 12 is lowered as a unit around the casing 28 into the annular space between the casing 28 and the wall of the bore of the casing head housing.

Next, the seal assembly comprising the resilient seal rings 66 and 68, intermediate spacer ring 70 and annular retainer ring 72 are installed in the annular groove and the annular seal ring 110 is installed in annular groove 108, the locking shoes 76 being initially fully retracted into the recess 50 by operation of screws 88. The tubing head housing is then connected to the top of the casing head housing by inserting and lowering the annular coupling section 54 of the tubing head housing into the bore 42 of the upper end portion of the casing head housing to a position where the flange 52 comes to rest upon the upper end surface 58.

Following this, the locking shoe operating screws 88 are adjusted to extend the locking shoes 76 inwardly from the recess 50 thereby bringing the locking shoe lands 80, 82 and 84 into firm wedging engagement with the grooves 75, 62 and 64, in the lower coupling section 54 of the tubing head housing. The tubing head housing is thus securely locked or anchored within the upper section of the casing head housing, the lands of the locking shoe 76 and the material between and forming the corresponding grooves into which they make locking engagement in the coupling section 54 of the tubing head housing, resisting in shear such forces as exerted by fluid pressure within the well tending to expel the tubing head housing from the casing head housing.

Following the foregoing operations, a quantity of fluid, plastic or the like suitable material is injected through the injection port 96 into the ducts 90 and 92 of the spacer rings 70, from which it enters into the dished lower edge of the upper resilient seal ring 66 and the dished upper end of the lower resilient seal rings 68. Following this, the threaded driving screw 104 is threaded into the inner threaded portion 102 of the injection port and screwed inwardly to apply pressure to the fluid or plastic therein thereby to apply sufficient longitudinal compressive forces to these rings to expand them laterally into sealing engagement between the groove 90 and the inner wall surface of the bore 42 of the casing head housing. Next, the closure plug 100 is screwed into the outer threaded portion 98 to securely close the injection port. The annular seal ring 110 is similarly forced into fluid-tight sealing engagement with the outside surface of the casing 28 by introduction of fluid or plastic under pressure through the duct 112.

Following the foregoing assembly operations, the tubing string 119 is run into the well through the tubing head housing and casing head housing. The suspension mandrel 16 is threadedly coupled by means of threads 158 to the top end of the tubing string and the string finally lowered to a position where the downwardly facing, beveled shoulder 120 adjacent the lower end of the tubing suspension mandrel is seated upon the upwardly facing, beveled shoulder 118 of the bore of the tubing head housing, the seal ring assembly comprising the annular seal rings 128 and 130, spacer ring 132 and the top retainer ring 134 having been previously installed in the groove 122. Following this, the locking shoes 142 are adjusted by the locking shoe operating screws 152 to bring the lands of such locking screw into firm locking engagement with the corresponding grooves in the tubing suspension mandrel in the manner hereinbefore described in connection with the installation of the tubing head housing. The operating screws 152 of the locking shoes 142 in this case are provided with an intermediate, unthreaded cylindrical section which passes through a packing device in the wall of the tubing head housing comprising packing rings 154 and packing gland nut 156. The packing-off of the locking shoe operating screws 152 in this manner is for the purpose of preventing escapes of fluids or gases which, in some cases, many accumulate in the clearance spaces bounded by the tubing suspension mandrel 16, the upper portion of the tubing head housing above the packing rings 128 and 130, and below the lower end of the Christmas tree adapter 18.

Following the foregoing operations, the Christmas tree adapter 18 is then inserted in the annular space between the upper exterior portion of the tubing suspension mandrel 16 and the upper bore portion 161 of the tubing head housing and the before-described operations, with respect to the locking shoes 196 and the seal rings 182 and 184, are repeated. Similar sealing operations are performed with respect to the annular seal rings 220 and 222 by introducing fluid, plastic or other suitable material under pressure through the duct 224.

The locking shoes 196, instead of being operated by adjustment of threaded screws as in the case of locking shoes 76 and 142, are here operated by means of piston rods 204 which extend radially through the walls of the tubing head housing from the locking shoes 196 in the recess 194, into cylinders 208, the inner end of each of the piston rods 204 being connected to a piston 206. By introducing fluid under pressure alternately into the ports 210 and 212 adjacent the opposite ends of each of the cylinders 208, the piston rods 204 are forced inwardly or outwardly as desired to bring the locking shoes 196 into forceful locking engagement with the grooves in the Christmas tree adapter body or to retract the shoes into the groove 194. An advantage of the latter means of actuating the locking shoes is that it does not require manual operation as by means of suitable wheels, wrenches, or the like devices as may be required in the case of the screwed adjusting means and therefore it may conveniently be operated from a remote location. However, either the screwed adjusting means or the fluid pressure operating means or any other suitable manual or power operated means may be employed for actuation of any of the before-described locking shoes interchangeably as desired.

The duct 230, shown externally plugged at 233, is for the purpose of testing, by suitable means such as a pressure gauge, to determine whether or not fluid pressure has accumulated in the before-mentioned clearance spaces including the clearance space between the beveled lower end surface 174 of the Christmas tree adapter and the beveled shoulder 162 of the tubing head housing, which would be indicative of leaks of well fluid past either the seal rings 220 or seal rings 128 and 130.

The duct 226, shown plugged at 228, is similarly for the purpose of testing to determine whether or not fluid pressure is present in the clearance space between the seal rings 220 and 222, which would be indicative of leaks of well fluid past either seal ring 220 or 222. In event leaks occur or develop past any of these gland type seals it is only necessary to inject additional fluid or plastic under increased pressure into the injection port of the sealing assembly involved.

The jack screws 236 in the flange 52 of the tubing head housing are for the purpose of applying downward force to the upper end 58 of the casing head housing and corresponding upward force to the flange 52 of the tubing head housing when it is desired to break loose and disengage the lower annular body portion 54 of the tubing head housing from its engagement within the upper bore portion 42 of the casing head housing.

As hereinbefore mentioned, and as shown in FIGURE 3, the locking shoes are arcuate in shape, having inner surfaces, including the locking lands, formed with curvatures having radii less than the radii of the corresponding grooves into which they make locking engagement. The purpose of this is to insure that, when the locking shoes are thrust into forceful locking engagement with the locking grooves, the outer end portions of each shoe will make firm locking engagement with such grooves. In so doing, each of the locking shoes will be sprung open slightly such that its curvature will conform to the curvature of the surfaces of the grooves into which it is forced.

An important advantage of the construction of the well head assembly of the present invention resides in the use of the locking shoe method of retaining the several elements of the assembly coupled together against the force of fluid pressures tending to separate them from one another. This advantage arises from the placing of the locking shoes in locking position in the assembly such that they present a relatively thick body of metal subject to shear, instead of tension and bending as is the case of bolted, flanged couplings, in resisting the fluid forces tending to separate the components of the assembly, and this feature makes the assembly capable of being designed with sufficient strength to withstand any fluid pressures which may be encountered in a well. Another advantage in this construction resides in the adaptation and combination therewith of the gland type of seals, which may be made and maintained fluid-tight between the several assembled components without the necessity of holding the dimensional tolerances and relative positions thereof to such close limits as heretofore required, and without the extremely high quality finishes heretofore employed. A further advantage in this seal construction resides in the facility with which such leaks as might develop can be detected and eliminated while maintaining full pressure in the well.

It is to be understood that the foregoing is illustrative only, and that the invention is not limited thereby but includes all modifications thereof within the scope of the definition of the appended claims.

I claim:

1. Well head assembly apparatus comprising: a first housing having a longitudinal bore portion and formed with an upwardly-facing shoulder; a second housing having an annular portion in longitudinally slidably coupled position within said bore portion, said second housing being formed with a downwardly-facing shoulder that rests upon said upwardly-facing shoulder; at least one recess formed around the inside surface of said bore portion; upper and lower outwardly-facing annular grooves formed around the outer surface of said annular portion, said upper groove and said recess being in opposite, concentric juxtaposition when said annular portion is in coupled position within said bore portion as aforesaid, and the lower surface of said upper groove sloping radially outwardly and downwardly; an annular packing ring and an annular packing retainer ring positioned in said lower groove, said packing ring and said retainer ring being in coaxial end-to-end abutment therein, said retainer ring being above said packing ring and, the upper surface of said retainer ring sloping radially outwardly and downwardly; at least one elongated arcuate shoe member carried in said recess and slidable radially thereof between a retracted position and an extended position relative to said annular recess, the inner surface of said shoe member being formed with at least two concentrically arcuate, longitudinally spaced apart, inwardly projecting lands, the lower surface of each of said lands sloping radially outwardly and downwardly, the upper one of said lands being engageable with the upper groove of said second housing when said shoe member is in said extended position, and the lower one of said lands being engageable with the upper surface of said retainer ring when said shoe member is in such extended position thereby moving said retainer ring axially in said lower groove against said packing ring and at the same time forcing said shoulders into mutual contact locking said second housing against upward motion relative to said first housing, the lands of said shoe member being free of engagement with said grooves and said retainer ring when said shoe member is in such retracted position; and force-transfer means to slide said shoe member between said retracted and extended positions.

2. Well head assembly apparatus as set forth in claim 1 wherein said packing ring includes a ducted metal spacer ring and resilient seal rings disposed above and below said metal ring and said ducted metal ring receives fluid material under pressure.

3. Well head assembly apparatus as set forth in claim 1 wherein said shoe members have an inner surface radius of curvature less than the radius of curvature of said upper groove.

4. Well head assembly apparatus as set forth in claim 3 wherein said packing ring includes a ducted metal spacer ring and resilient seal rings disposed above and below said metal ring and said ducted metal ring receives fluid material under pressure.

5. Well head assembly apparatus as set forth in claim 3 wherein said force-transfer means includes fluid pressure-operated cylinder and piston means carried by said first housing whereby movement of said shoe members may be controlled from a location remote from said well head assembly.

References Cited by the Examiner
UNITED STATES PATENTS

| | | | |
|---|---|---|---|
| 1,983,938 | 12/34 | Humason | 285—140 |
| 2,086,431 | 7/37 | Penick | 285—141 |
| 2,134,044 | 10/38 | Humason | 285—141 |
| 2,157,496 | 5/39 | Penick | 285—141 |
| 2,178,699 | 11/39 | Penick | 285—141 |
| 2,188,557 | 1/40 | Otis | 285—111 |
| 2,191,975 | 2/40 | Stephens. | |
| 2,254,752 | 9/41 | Penick | 285—141 |
| 2,544,471 | 3/51 | Rither | 188—74 |
| 2,775,472 | 12/56 | Brown | 285—145 |
| 2,849,245 | 8/58 | Baker | 285—141 |
| 2,874,436 | 2/59 | Allen | 285—146 |
| 3,062,565 | 11/62 | Word. | |
| 3,090,438 | 5/63 | Raulins | 166—89 |

THOMAS F. CALLAGHAN, *Primary Examiner.*
CARL W. TOMLIN, *Examiner.*